United States Patent [19]

Ophardt

[11] Patent Number: 5,165,577
[45] Date of Patent: Nov. 24, 1992

[54] DISPOSABLE PLASTIC LIQUID PUMP

[76] Inventor: Heiner Ophardt, 3931 Vineyard Cres, Vineland, Ontario, Canada, L0R 2C0

[21] Appl. No.: 702,937

[22] Filed: May 20, 1991

[51] Int. Cl.$^5$ .............................................. B67D 5/06
[52] U.S. Cl. .................................... 222/181; 222/321; 222/325; 222/340; 417/545; 417/547; 417/550
[58] Field of Search ............. 222/181, 320, 321, 325, 222/326, 340, 378, 383, 385; 417/545, 547, 550

[56] References Cited

U.S. PATENT DOCUMENTS

| | | | |
|---|---|---|---|
| 3,124,080 | 3/1964 | Sisson | 103/178 |
| 3,193,159 | 7/1965 | Swindler | 222/336 |
| 4,118,152 | 10/1978 | Bron | 417/545 X |
| 4,360,130 | 11/1982 | Nishimura et al. | 222/153 |
| 4,364,718 | 12/1982 | Beun et al. | 222/181 X |
| 4,548,340 | 10/1985 | Messer | 222/135 |
| 4,589,573 | 5/1986 | Tada | 222/153 |
| 4,615,361 | 10/1986 | Bartle, Sr. | 417/550 X |
| 4,615,476 | 11/1986 | Hobbs et al. | 222/153 |
| 4,621,749 | 11/1986 | Kanfer | 222/383 X |
| 4,651,902 | 12/1986 | Hobbs et al. | 222/153 |
| 4,673,109 | 6/1987 | Cassia | 222/383 X |
| 5,051,073 | 9/1991 | Newbold | 417/550 X |

FOREIGN PATENT DOCUMENTS

| | | | |
|---|---|---|---|
| 506705 | 10/1954 | Canada | 222/383 |
| 1528603 | 7/1969 | Fed. Rep. of Germany . | |
| 2513766 | 9/1975 | Fed. Rep. of Germany . | |
| 2727679 | 11/1978 | Fed. Rep. of Germany | 222/181 |
| 607483 | 8/1960 | Italy | 417/550 |

*Primary Examiner*—Andres Kashnikow
*Assistant Examiner*—Joseph A. Kaufman
*Attorney, Agent, or Firm*—Riches, McKenzie & Herbert

[57] ABSTRACT

A disposable plastic pump for dispensing liquids is disclosed which comprises three basic unitary all plastic elements: a chamber forming body having an open outer end and an inner end in fluid communication with a liquid reservoir, a one-way valve located at the inner end of the chamber between the reservoir and the chamber permitting fluid flow only from the reservoir into the chamber, and a piston formed to slidably fit into the chamber. The piston comprises a stem on which is located an inwardly located flexing element serving as a one-way valve to permit fluid flow outwardly past the flexing element and a sealing element located outwardly of the flexing element. A channel is provided from an inlet on the piston between the flexing element and the sealing element through which the dispensed liquid flows.

12 Claims, 6 Drawing Sheets

DISPOSABLE PLASTIC LIQUID PUMP

SCOPE OF THE INVENTION

This invention relates generally to a disposable plastic pump, and more particularly to an inexpensive all plastic, disposable pump assembly for dispensing hand soap.

BACKGROUND OF THE INVENTION

Many pump assemblies are known for dispensing hand soap. Typically even the simplest of these assemblies include at least four separate elements, a chamber forming body, two one-way valves and a piston. These pumps suffer the disadvantage that they have a number of individual parts and costs typically increase with the number of parts and the assembly required.

Known disposable pump assemblies for dispensing hand soap typically include at least some metal parts such as metal balls for one-way valves and metal springs to bias one-way valves closed. The inclusion of metal parts suffers the disadvantage that the pump assemblies can not merely be ground up in plastic grinders for recycling in that the metal parts are not compatible with most plastic grinding machines.

Known hand soap dispensing systems provide replaceable receptacles for liquid soap with permanent pump assemblies to pump soap from the receptacles. This has the disadvantage that the pumps are expensive and after prolonged usage may fail or require cleaning and maintenance.

SUMMARY OF THE INVENTION

To at least partially overcome these disadvantages of known liquid containers and pumps, the present invention provides a pump assembly for dispensing liquids with a novel, unitary construction for a piston so that the pump will have as few separate parts as possible, preferably fewer than four, which may be easily assembled.

Another object is to provide a unique configuration for an inexpensive disposable piston for a disposable pump which can be injection molded, as a unitary element entirely from plastic yet incorporate a one-way valve.

Another object is to provide a disposable plastic pump assembly formed entirely from three unitary plastic elements without any metal parts.

Another object is to provide a system for dispensing hand soap comprising a permanent housing and pump activator and a disposable soap reservoir and pump assembly.

Another object is to provide a disposable pump for dispensing liquids, adapted to be used with a disposable fluid container, which may be readily recycled without first requiring disassembly of the parts of the pump prior to crushing or shredding of the disposed container-pump assembly.

The present invention provides an inexpensive, easy to assemble, disposable pump for dispensing liquids, which is readily adapted to fit in a friction fit manner into the neck of a liquid reservoir, preferably a disposable reservoir. The pump comprises three basic unitary elements: a chamber forming body, a one-way valve and a piston. The body forms a chamber having an open outer end and an inner end which is in fluid communication with the reservoir. A one-way valve is located at the inner end of the chamber between the reservoir and the chamber, permitting fluid flow only from the reservoir into the piston-chamber.

The piston is formed to be slidably received in the piston-chamber and comprises a stem. A flexing element, which serves as a one-way valve permitting fluid flow only outwardly past the flexing element is located inwardly on the stem. A sealing element which forms a substantially fluid impermeable seal between the sealing element and the piston-chamber is located outward on the stem from the flexing element. A channel is provided from an inlet on the piston between the flexing element and the sealing element to permit fluid flow to an outlet outward of the sealing means.

Liquids are drawn from the reservoir by the outward and inward movement of the piston. Outward movement causing fluids to pass from the reservoir, through the one-way valve and into the piston-chamber. Inward movement causing the one-way valve to close and the flexing element to bend allowing liquid to pass outwardly via the channel.

After exhaustion of the liquids contained in the reservoir, the reservoir is replaced, preferably together with a new pump assembly attached.

Preferably both the reservoir and the pump are formed entirely of plastic so as to permit easy recycling of the plastic parts.

The piston is provided with a unique combination of features which permits it to be injection molded from plastic as a unitary element yet incorporate a one-way valve.

The present invention also provides for a system for dispensing liquids having: a disposable plastic element suitable for recycling comprising a disposable liquid reservoir and a disposable pump assembly each formed entirely out of recyclable plastic, and a permanent non-disposable housing for the reservoir and pump assembly including a permanent actuating system to operate the pump assembly. Any non-recycleable or metal parts are incorporated into the permanent housing to ensure the disposable parts can be readily recycled.

Accordingly, in one of its aspects, this invention provides for a pump for dispensing liquids from a reservoir comprising a piston-chamber forming element having a cylindrical chamber, said chamber having a chamber wall, an outer open end and an inner end in fluid communication with the reservoir, one-way valve means between the reservoir and the chamber permitting fluid flow through an inner end of said chamber, only from the reservoir to the chamber, a piston forming element slidably received in the chamber extending outwardly from the open end thereof, said piston forming element comprising flexing means, sealing means, and channel means, the sealing means engaging the chamber wall circumferentially thereabout to form a substantially fluid impermeable seal therewith on sliding of said piston element inwardly and outwardly, the flexing means spaced inwardly on said piston element from the sealing means, the channel means providing fluid communication through said piston element from an inlet on the piston means between the flexing means and the sealing means, to an outlet on the piston means outward of the sealing means, the flexing means having an elastically deformable edge portion proximate the chamber wall circumferentially thereabout, wherein in operation, on the piston forming element sliding outwardly in said chamber the flexing means substantially preventing fluid flow past the flexing means in an inward direction, and on the piston forming element sliding inwardly into the chamber the flexing means elastically deforms away from the chamber wall to permit fluid flow past the flexing means in an outward direction, the piston forming element consisting of a unitary element formed entirely of plastic by injection molding.

In another of its aspects, this invention provides for a pump for dispensing liquids from a reservoir, comprising a piston-chamber forming element having a chamber with a chamber wall, an outer open end and an inner end in fluid communication with the reservoir, one-way valve means between the reservoir and the chamber permitting fluid flow only from the reservoir to the chamber, a piston forming element slidably received in the chamber extending outwardly from the open end thereof, said piston forming element comprising flexing means, sealing means, flange means and channel means, the sealing means engaging the chamber wall circumferentially thereabout to form a substantially fluid impermeable seal therewith on sliding of said piston element inwardly and outwardly, the flexing means spaced inwardly on said piston element from the sealing means, the flange means spaced outwardly on said piston element from the sealing means, the channel means providing fluid communication through said piston element from an inlet on the piston means between the flexing means and the sealing means, to an outlet on the piston means outward of the sealing means, the flexing means having an elastically deformable edge portion proximate the chamber wall circumferentially thereabout, wherein in operation on the piston forming element sliding outwardly in said chamber the flexing means substantially prevents fluid flow past the flexing means in an inward direction, and on the piston forming element sliding inwardly into the chamber the flexing means elastically deforms away from the chamber wall to permit fluid flow past the flexing means in an outward direction, each of the piston-chamber forming element, the one-way valve and the piston forming element consisting of a unitary element formed by injection molding said reservoir having an open neck adapted to receive said pump in a friction fit manner, an actuating lever formed to engage the flange means to slidably move said piston within said chamber spring means adapted to return said actuating lever to a rest position, housing adapted to permanently receive and retain said actuating lever and said spring means.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 2:
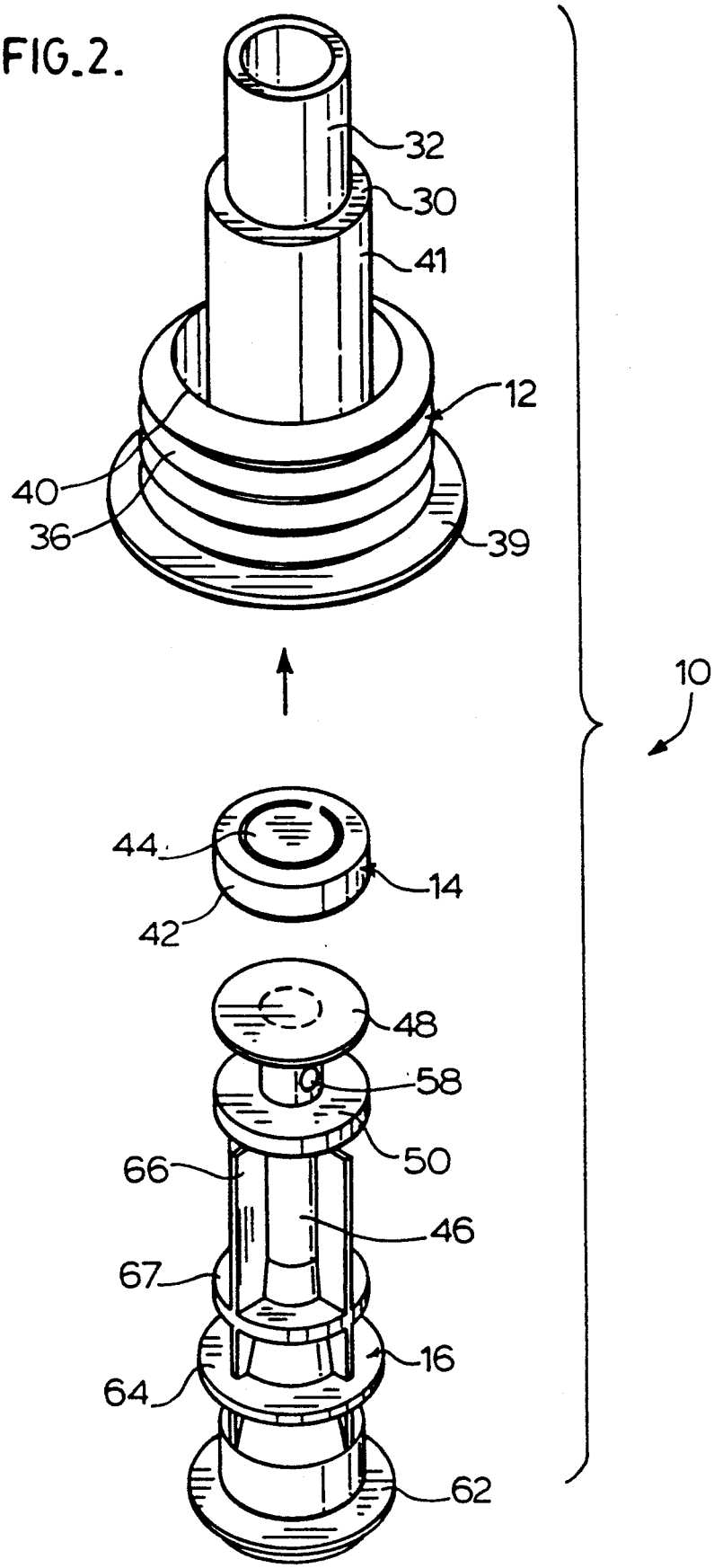
FIG. 2 is a partially exploded perspective view of the preferred embodiment of the pump assembly shown in FIG. 1.
Figure 3:
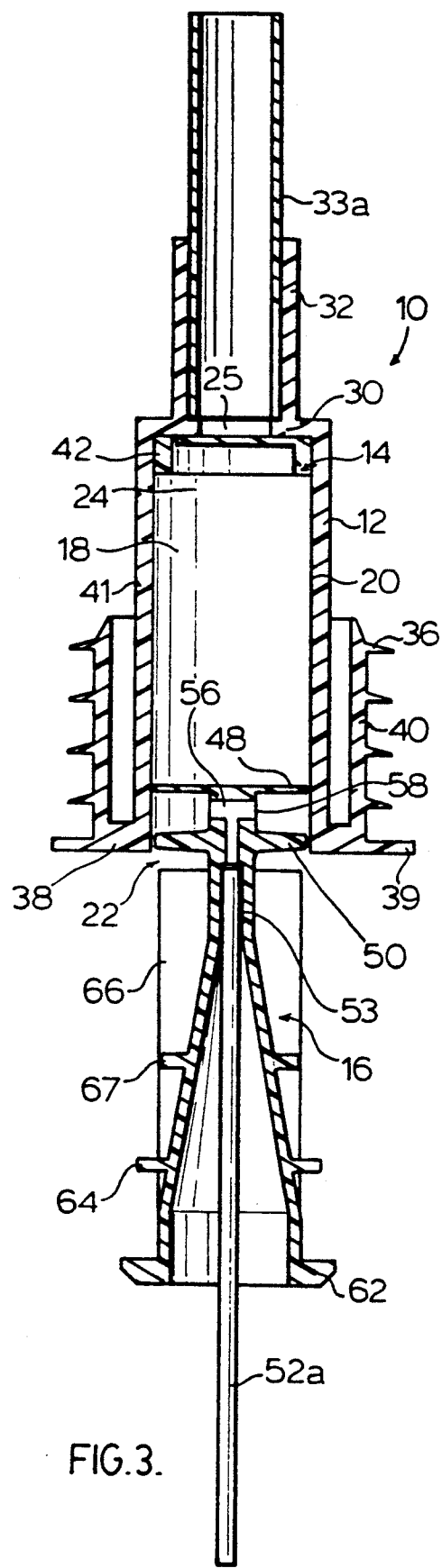
FIG. 3 is a cross sectional side view of an assembled pump assembly of FIG. 2.

Reference is made first to FIGS. 2 and 3 which show a pump assembly generally indicated 10. Pump assembly 10 is best shown in FIG. 2 as comprising three principle elements, a piston chamber forming body 12, a one-way valve 14 and a piston 16.

In essence body 12 has a cylindrical inner chamber 18 with the one-way valve 14 secured at an inner end 24 of the chamber 18. Piston 16 is axially slidably received in chamber 18 for reciprocal sliding movement inwardly and outwardly of an open end 22 of chamber 18. Body 12 not only carries the one-way valve 14 and piston 16 but is also adapted to be frictionally engaged into a cylindrical neck 34 of the fluid reservoir 26 shown in FIG. 1. With the pump assembly 10 coupled to reservoir 26, reciprocal movement of piston 16 will pump fluid from the reservoir 26 through piston 16.

As seen in FIG. 2 body 12 is generally cylindrical in cross-section and symmetrical about its central axis. Body 12 has an inner cylindrical portion 41 forming the chamber 18 and, disposed coaxially thereabout and spaced therefrom an outer cylindrical portion 40. The inner and outer cylindrical portions are joined by a disc-like rim 38 extending radially outwardly about open end 22 of chamber 18. Sealing and gripping flanges 36 are provided about the outer cylindrical portion 40 to assist in frictionally engaging the inner surfaces of reservoir neck 34 and form a fluid impermeable seal therewith. Rim 38 continues radially outwardly past flanges 36 as stop flange 39 which serve to limit insertion of body 12 into reservoir neck 34.

Chamber 18 is disposed coaxially within inner cylindrical portion 40, with the chamber 18 terminating at its inner end 24 at a radially inwardly extending inner shoulder 30 with a central opening 25 therethrough. Hollow, cylindrical intake extension 32 shown as being of a lesser diameter extends axially away from shoulder 30.

One-way valve 14 is best shown in FIG. 2 to comprise an annular ring 42 having a coaxially located flexible circular flap 44 hingely connected thereto. In assembly, as seen in FIG. 3 the one-way valve 14 is slidably inserted into the 18 to abut the inner shoulder 30. Preferably, one-way valve 14 is formed entirely of plastic and is formed by injection molding. The abutting inner shoulder 30 disposed between the one-way valve 14 and the reservoir 26 is sized having a smaller radius than the radius of the circular flap 44, so as to prevent bending of the circular flap 44 inward towards the reservoir 26. The circular flap 44 is free to bend outwardly and thus permit only outward flow of fluid 28 from the reservoir 26 into chamber 18. The chamber 18 and one-way valve 14 are assembled such that the circumferential surface of annular ring 42 engages the chamber wall 20 in a friction fit relationship.

As best seen in FIG. 2, piston 16 is generally cylindrical in cross section and adapted to be slidably received in chamber 18. Piston 16 is a unitary element formed entirely of plastic preferably by injection molding. Piston 16 has a central hollow stem 46 extending along the central longitudinal axis of the piston 16. A circular resilient flexing disc 48 is located at the inward most end of the piston 16 and extends radially therefrom. Flexing disc 48 is sized to circumferentially abut the cylindrical inner chamber wall 20 substantially preventing fluid flow therebetween.

A circular sealing disc 50 is located on the stem 46 spaced axially outwardly from the flexing disc 48. The sealing disc 50 extends radially outward from the stem 46 to circumferentially engage the chamber wall 20 to form a substantially fluid impermeable seal therebetween. Sealing disc 50 is formed sufficiently rigid so as to resist deformation, maintaining a substantially fluid impermeable seal with the chamber wall 20 on sliding the piston 16 in and out of the chamber 18.

Piston stem 46 has a central hollow passage 52 extending along the axis of the piston 16 from an inner end located in the stem 46 between the flexing disc 48 and the sealing disc 50, to an outlet 54 at the outer end of the piston 16. A channel 56 passes from inlets 58 located on either side of the stem 46 between the flexing disc 48 and the sealing disc 50, radially inward through the piston 16 to communicate with central passage 52. The channel 56 and central passage 52 permit fluid communication through the piston 16, past the sealing disc 50, between the inlets 58 and the outlet 54.

As best shown in FIGS. 2 and 3, an outer circular engagement flange 62 is provided on the outermost end of the stem 46 which extends radially outwardly from about the outlet 54. As discussed later flange 62 may be engaged by an actuating device in order to move the piston 16 in and out of the body 12.

A circular stopping disc 64 is provided on the stem 46 between the flange 62 and the sealing disc 50 extending radially outward from the stem 46. Stopping disc 64 has a radius greater than the radius of the chamber 18 such that the stopping disc 64 limits inward movement of piston 16 by abutment of the stopping disc 64 with rim 38 about outer end 22 of the body 18.

Axially extending webs 66 and circumferential ribs 67 are provided to extend radially from stem 46. These webs 66 and rib 67 engage chamber wall 20 so as to assist in maintaining the piston 16 in an axially centered and aligned position when sliding in and out of the chamber 18.

Figure 4:
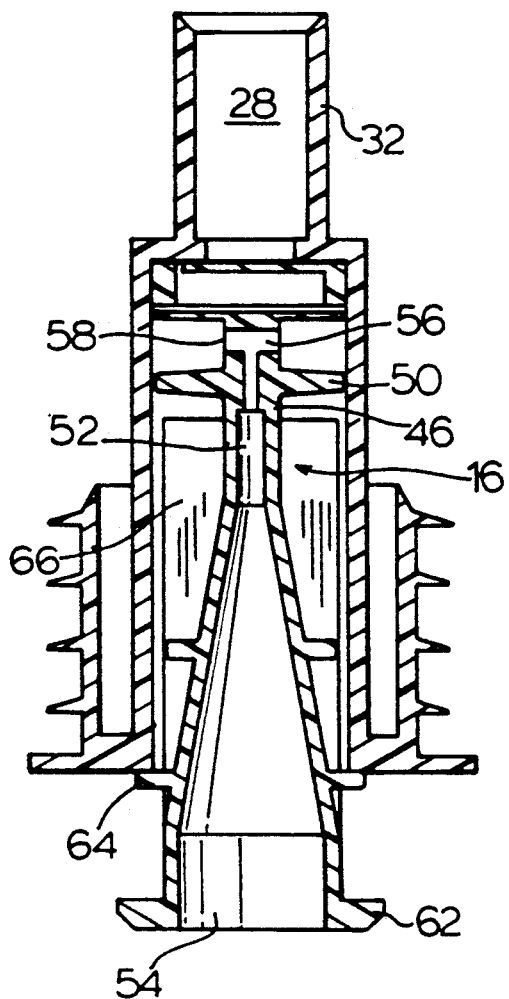
FIG. 4 is a cross sectional side view similar to FIG. 3 but with the dispensing piston in the fully inserted position.
Figure 5:
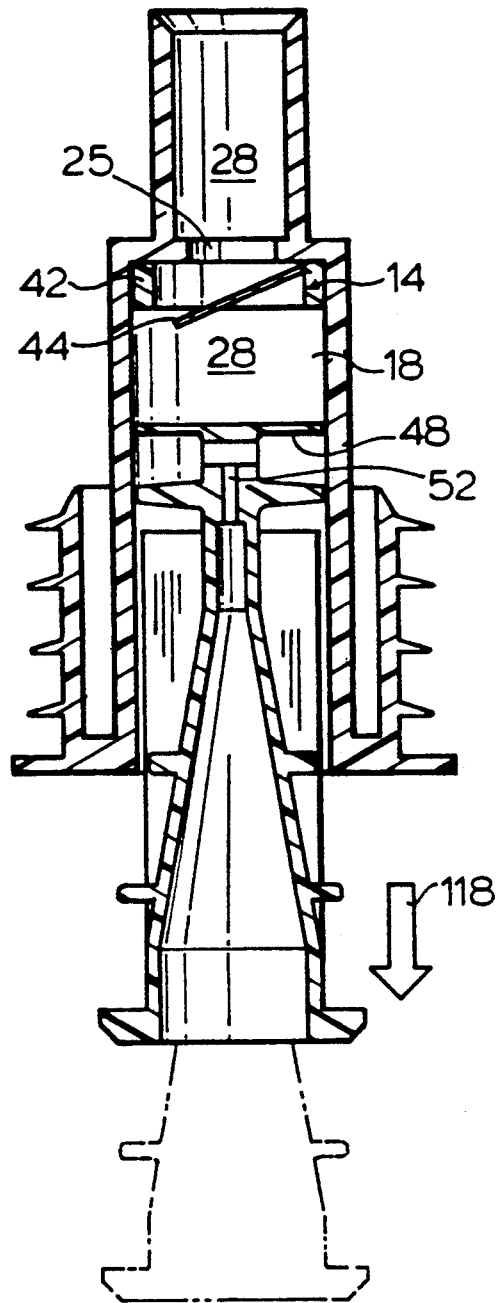
FIG. 5 is a cross sectional side view similar to FIG. 3 but with the dispensing piston in a partially extended position in a withdrawn stroke.
Figure 6:
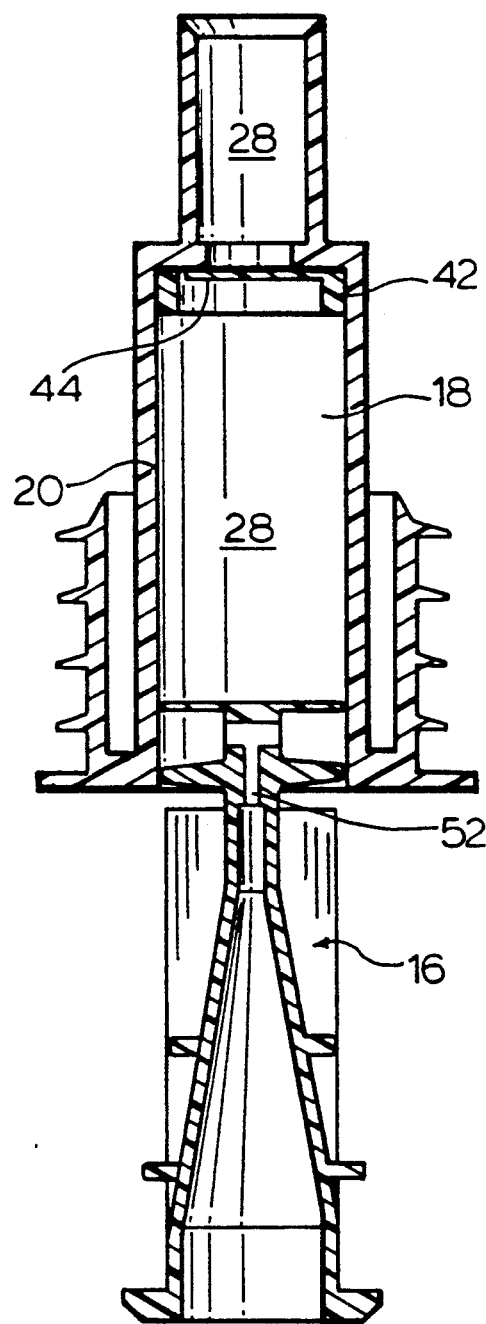
FIG. 6 is a cross sectional side view similar to FIG. 3 but with the dispensing piston in a fully withdrawn position.
Figure 7:
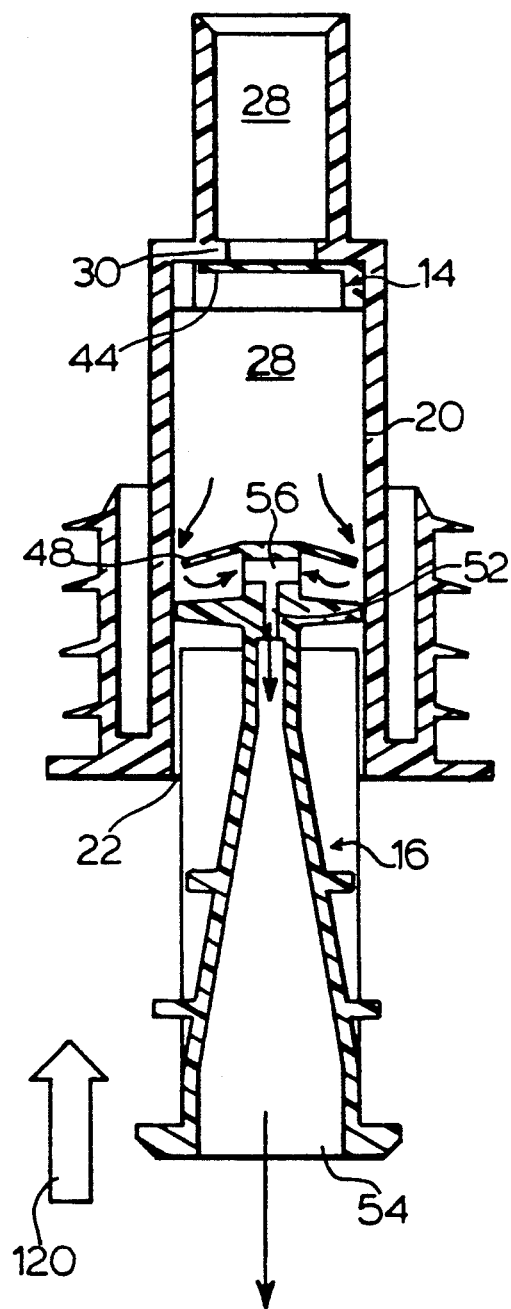
FIG. 7 is a cross sectional side view similar to FIG. 3 but with the dispensing piston in a partially inserted position in a return stroke.

Operation of the pump assembly 10 is now described with particular reference to FIGS. 4, 5, 6 and 7. FIG. 4 shows the pump assembly with piston 16 in a fully retracted position. FIG. 6 shows the pump assembly with piston 16 in a fully withdrawn position. FIG. 5 shows the pump assembly with piston 16 during a withdrawn stroke moving in the direction of arrow 118 from the retracted position of FIG. 4 to the withdrawn position of FIG. 6. FIG. 7 shows the pump assembly with piston 16 during a return stroke moving in the direction of arrow 120 from the withdrawn position of FIG. 6 to the retracted position of FIG. 4. Repeated pumping action results by repeatedly cycling the pump assembly through the positions in sequence of FIGS. 4, 5, 6 and 7.

During the withdrawal or out stroke of FIG. 5, the withdrawal of the piston causes one-way valve 14 to open with fluid to flow into chamber 18 past open flap 44. In the withdrawal stroke flexing disc 48 remains substantially undeflected and assists in creating suction forces in chamber 18 to open flap 44 and draw fluid into chamber 18 past flap 44.

During the return stroke of FIG. 7, the return of piston 16 pressurizes fluid in chamber 18 between the piston and one-way valve 14. This pressure urges flap 44 to a closed position abutting shoulder 30. As a result of this pressure, flexing disc 48 deflects a its periphery as indicated in FIG. 7 so as to come out of sealing engagement with chamber walls 20 and permit fluid to flow past disc 48 and out of chamber 18 via passage 52 and channel 56 and passage 52.

The flexing disc 48 needs on one hand to substantially prevent flow therepast in the withdrawal stroke and on the other hand deform to permit flow therepast in the return stroke. The disc 48 shown facilitates this by being formed as a thin resilient disc in effect having an elastically deformable edge portion near chamber wall 20.

When not deformed flexing disc 48 abuts chamber wall 20 to form a substantially fluid impermeable seal. When deformed, as by its edge portion being bent away from wall 20, fluid may flow past the disc. Disc 48 is deformed when the pressure differential across it, that is the difference between the pressure on one side and the pressure on the other side, is greater than a maximum pressure differential which the disc can withstand without deflecting. When the pressure differential is greater than this maximum pressure differential, the disc deforms and fluid flows past. When the pressure differential reduces to less than this maximum pressure differential, the disc returns to its original shape substantially forming a seal with wall 20.

With a simple disc 48 of thin plastic as shown, the overall configuration of the pump assembly needs to be considered to achieve best results. For example, in a withdrawal stroke, the resistance of fluid flow into chamber 18 past the one-way valve 14 compared to the resistance to fluid flow back up channel 56 and passage 52 will affect the relative pressures on each side of the disc 48 and whether the disc will be deflected. Preferably the pump assembly is to be designed having regard to the viscosity of the fluid, the resistance to flow outwardly through one-way valve and the resistance to flow back inwardly through the piston 16 as well as the relative resiliency of the disc 48 so that in operation the flexing disc prevents fluid flow therepast in the outward stroke yet permits fluid flow therepast in the return stroke.

Disc 48 may be designed to resist deformation in one direction compared to the other so as to assist in achieving the desired operation.

Figure 1:
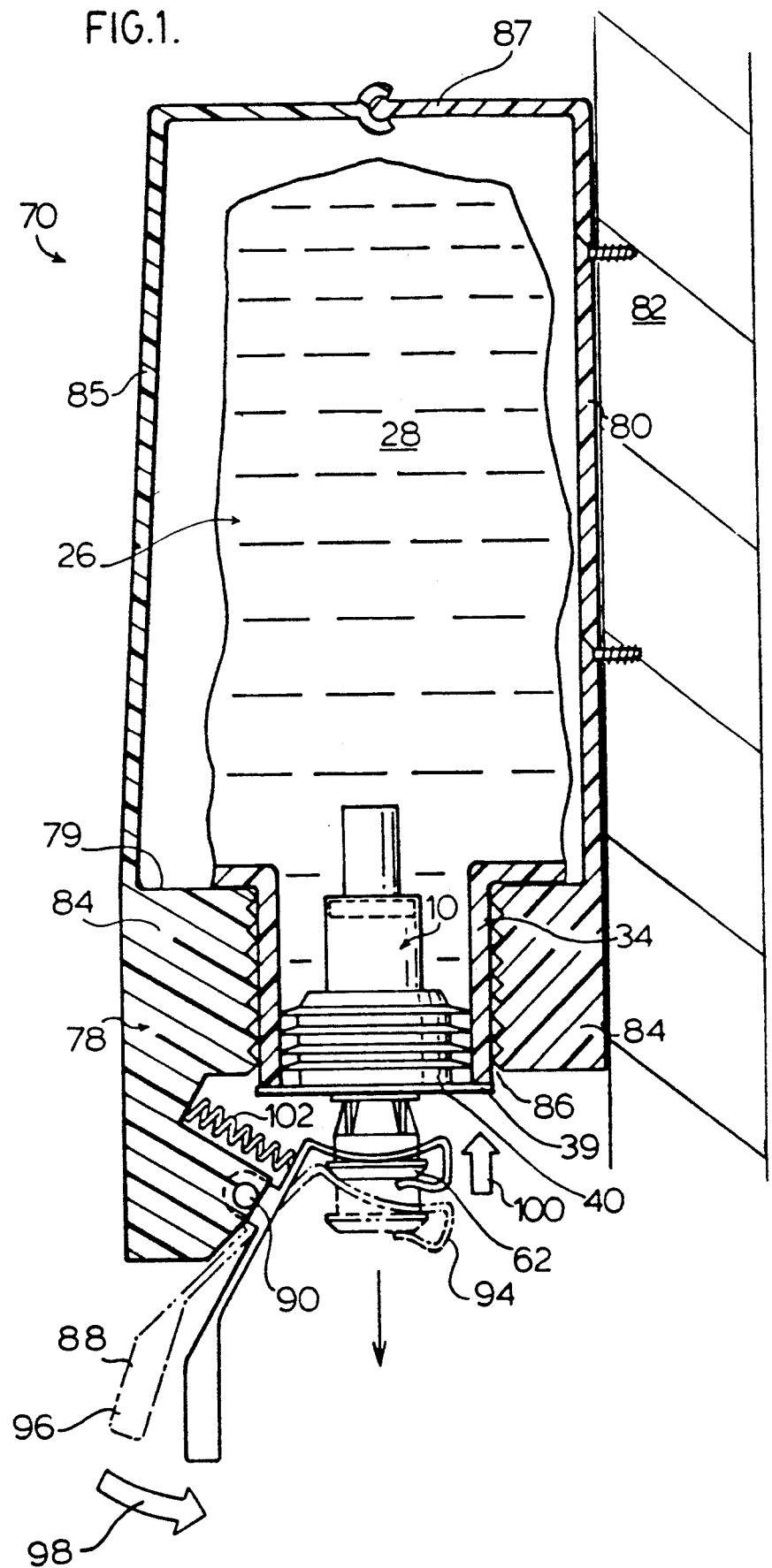
FIG. 1 is a partially cut away side view of a preferred embodiment of a liquid dispenser with the reservoir and pump assembly in accordance with the present invention.

Reference is now made to FIG. 1 which shows a liquid soap dispenser generally indicated 70 utilizing pump assembly 10 and reservoir 26 with pump assembly 10 inserted into neck 34 of reservoir 26. Dispenser 70 has a housing generally indicated 78 to receive and support the pump assembly 10 and reservoir 26. Housing 78 is shown with a back plate 80 for mounting the housing, for example to a building wall 82. A bottom support plate 84 extends forwardly from the back plate to receive and support the reservoir 26 and pump assembly 10. As shown bottom support plate 84 has a circular opening 86 therethrough. The reservoir 26 sits, supported on plate 79 with its neck 34 extending through opening 86 and secured in the opening as by friction fit, clamping and the like. A cover member 85 is hinged to an upper forward extension 87 of back plate 80, so as to permit replacement of reservoir 26 and its pump assembly 10.

Bottom plate 84 carries at a forward portion thereof an actuating lever 88 journalled for pivoting about a horizontal axis at 90. An upper end of lever 88 carries a hook 94 to engage engagement flange 62 and couple lever 88 to piston 16, such that movement of the lower handle end 96 of lever 88 from the solid to the dotted line position, in the direction indicated by arrow 98 slides piston inwardly in a return, pumping stroke as indicated by arrow 100. On release of lower handle end 96, spring 102 biases the upper portion of lever 88 downwardly, so that the lever 88 draws piston 16 outwardly to a fully withdrawn position as seen in solid lines in FIG. 1. Lever 88 and its inner hook 94 are adapted to permit manually coupling and uncoupling of the hook 94 as is necessary to remove and replace reservoir 26 and pump assembly 10.

In use of the dispenser 70, once exhausted the empty reservoir 26 together and attached pump 10 is removed and a new reservoir 26 and attached pump 10 are inserted into the housing. Preferably, the removed reservoir 26 and attached pump 10 is made entirely of recyclable plastic material which may easily be recycled without the need for disassembly prior to cutting and shredding.

FIG. 3 shows two tubular extensions of the pump assembly which are not shown in the other Figures.

Firstly an inlet extension tube 33a may be provided as a separate cylindrical plastic tube which has an outer diameter sized to frictionally engage in sealed relation in hollow, cylindrical intake extension 32. Such an intake extension tube 33a may be necessary if the pump assembly is used in a dispenser configuration not shown as where the fluid level is either below the pump assembly or spaced from the pump assembly.

Secondly an outlet extension tube 52a may be provided as a separate cylindrical plastic tube which has an outer diameter sized to frictionally engage in sealed relation in a hollow cylindrical portion 53 of channel 52 in the stem 46 of the piston 16. Such an outlet extension tube 52a may be useful to direct more particularly the location of discharge of the pump, or if the pump pumps fluid upwardly, when the tube may be bent as a spout.

While the preferred embodiment of FIG. 2 shows a plastic cylindrical piston-chamber 12 and piston 16, piston-chambers and pistons of other symmetrical and non-symmetrical shapes and materials may also be used.

Although a piston-chamber 12 having a stop flange 39 and outer cylindrical portion 40 having gripping flanges 36 is preferred, the gripping flanges 36 or other gripping means could be provided elsewhere on the piston-chamber 12.

While the preferred embodiment of FIG. 3 shows a channel 56 passing from an inlet 58 on the stem 46 of the piston 16 and connecting with an axially aligned central passage 52, the channel 56 could also be provided permitting fluid communication outward past the sealing disc 50 without connecting with a central passage and without an inlet 58 disposed on the stem 46 of the piston 16.

Although the disclosure describes and illustrates a preferred embodiment of the invention it is to be understood that the invention is not limited to these particular embodiments. Many variations and modifications will now occur to those skilled in the art.

What I claim is:

1. A pump for dispensing liquids from a reservoir, comprising:
   (a) a piston-chamber forming element having a cylindrical chamber, said chamber having a chamber wall, an outer open end and an inner end in fluid communication with the reservoir;
   (b) one-way valve means between the reservoir and the chamber permitting fluid flow through the inner end of said chamber, only from the reservoir to the chamber;
   (c) a piston forming element slidably received in the chamber extending outwardly from the open end thereof;
   said piston forming element being generally cylindrical in cross-section with a central axially extending hollow stem having a central passageway open at an outer end forming an outlet and closed at an inner end;
   a circular flexing disc extending radially outwardly from the stem proximate the inner end, the flexing disc having an elastically deformable edge portion proximate the chamber wall circumferentially thereabout,
   a circular sealing disc extending radially outwardly from the stem spaced axially outwardly from the flexing disc, the sealing disc engaging the chamber wall circumferentially thereabout to form a substantially fluid impermeable seal therewith on sliding of said piston forming element inwardly and outwardly,
   an inlet located on the stem between the flexing disc and sealing disc in communication with the passageway via a short channel extending radially inward from the inlet to the passageway,
   engagement means on said stem outward of the chamber forming element for engagement to move the piston forming element inwardly and outwardly,
   locating means on said stem extending radially outwardly from the stem to engage said chamber wall and guide the piston forming element in sliding axially centered and aligned within the chamber,
   the locating means comprising a plurality of axially extending webs,
   wherein in operation,
   (i) on the piston forming element sliding outwardly in said chamber, the flexing disc substantially preventing fluid flow past the flexing disc in an inward direction, and
   (ii) on the piston forming element sliding inwardly into the chamber the flexing disc elastically deforms away from the chamber wall to permit fluid flow past the flexing disc in an outward direction.

2. A pump as claimed in claim 1 including a hollow cylindrical dispensing extension tube,
   said passageway sized to receive an inner end of the dispensing extension tube in sliding force-fit relation.

3. A pump as claimed in claim 1 wherein the engagement means comprises a circular flange extending radially outwardly from about the outermost end of said stem.

4. A pump as claimed in claim 3 including means provided on said stem to stop inward movement of the piston forming element by abutment with the piston-chamber forming element,
   the stop means comprising a circular disc extending radially outwardly form the stem spaced outwardly of the sealing disc and having a radius greater than that of the chamber.

5. A pump as claimed in claim 4 wherein the piston forming element consists of a unitary element formed entirely of plastic by injection molding.

6. A pump as claimed in claim 1 wherein the piston-chamber forming element is generally cylindrical in cross-section, the chamber ending at an inner shoulder with a coaxial smaller diameter inwardly extending hollow cylindrical intake extension formed integrally therewith, the one-way valve means slidably received in friction fit relation in the chamber proximate the inner shoulder.

7. A pump as claimed in claim 6 wherein the one-way valve means comprises an annular ring with a flexible circular flap formed entirely of plastic by injection molding.

8. A pump as claimed in 7 wherein the piston-chamber forming element having an inner cylindrical portion forming said chamber and cylindrical intake extension, stop flange means extending radially outwardly from about the outer end of the chamber, an outer cylindrical portion extending from the stop flange inwardly coaxially about the inner cylindrical portion spaced coaxially thereabout a radially outer surface of the outer cylindrical portion adapted to frictionally engage in fluid sealing relationship an opening in said reservoir.

9. A pump as claimed in 8 wherein said piston-chamber forming element is formed entirely of plastic by injection molding.

10. A pump as claimed in claim 6 including a hollow outer extension tube, the cylindrical extension having a section sized to receive an outer end of the outlet tube in sliding force-fit relation.

11. A pump as claimed in claim 1 wherein the piston forming element consists of a unitary element formed entirely of plastic by injection molding.

12. A unit for dispensing liquids comprising in combination:

(i) a pump as claimed in claim 1;
(ii) a reservoir for the liquids;
(iii) housing means;

said pump and reservoir formed entirely from plastic material which may be recycled by shredding or cutting without disassembly, the reservoir having an open neck adopted to receive said pump in a friction fit manner, the housing means removably supporting said reservoir and pump and including an actuation lever to engage the engagement means of said piston forming element to slidably move said piston forming element within the chamber, spring means adapted to return said actuating lever to a rest position, said housing means adapted to permanently receive and retain said actuating lever and said spring means.

* * * * *